Figure 1:
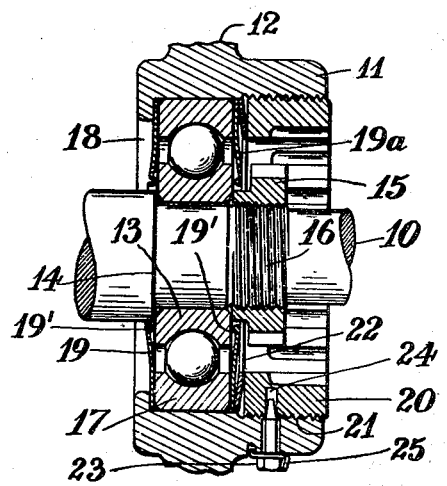

March 28, 1939.   A. C. BASEBE ET AL   2,151,730
PACKING DEVICE FOR RELATIVELY ROTATABLE PARTS
Filed June 18, 1936   2 Sheets-Sheet 1

Inventors
Arthur Cecil Basebe
Harold Sinclair

Patented Mar. 28, 1939

2,151,730

UNITED STATES PATENT OFFICE 2,151,730

PACKING DEVICE FOR RELATIVELY ROTATABLE PARTS

Arthur Cecil Basebe, Banstead, and Harold Sinclair, Kensington, London, England, assignors to Hydraulic Coupling Patents Limited, London, England, a company of Great Britain Application June 18, 1936, Serial No. 85,910
In Great Britain June 26, 1935

5 Claims. (Cl. 308—187.2)

The present invention relates to packing glands of the diaphragm type which serve to prevent the escape of fluid or the ingress of foreign matter between relatively rotatable parts. It is especially applicable to certain kinds of rotary hydraulic power transmitters, wherein a substantial fluid pressure may exist at times.

United States patent specification No. 2,011,735 described one kind of adjustable diaphragm packing gland, applied to a hydraulic coupling of the kinetic type. While this known gland has the advantage that it allows relative angular and lateral deviation of the parts to which it is attached, it requires a high degree of accuracy in manufacture and skilled adjustment, since it is sensitive to small changes in axial location of the parts.

An object of the present invention is to provide a diaphragm gland, which is applicable to apparatus in which there may be small relative angular and lateral deviations of the parts to which the gland is attached, the gland being cheap to manufacture and easy to fit.

This object is attained by making use of the accurate axial location that exists between the inner race and the outer race of a ball or roller bearing of the kind that is capable of tranmitting axial loads, such for example as a deep-groove ball bearing, or a taper roller bearing.

According to the present invention, a diaphragm gland is associated with a ball or roller bearing having two races fixed respectively to the two relatively rotatable parts between which the passage of fluid is to be prevented, and includes an annular impervious diaphragm one edge of which is fixed to one of these parts by being nipped, together with one of the races, between an abutment on the part and a clamping member capable of being tightened axially of the bearing, the free portion of the diaphragm contacting over an annular rubbing surface with a side of the race fixed to the other of the rotatable parts, or with the side of a washer or sleeve located by a side of the last-mentioned race. This last-mentioned race is located axially with respect to the part to which it is fixed by being nipped between an abutment on the part and a clamping member capable of being tightened axially of the bearing.

In a simple and reliable arrangement of the improved gland, the annular impervious diaphragm is fixed to the part carrying the outer race of the ball or roller bearing, and preferably immediately adjacent to a side of this race, and the diaphragm may be provided on its inner edge with a shallow annular projection bearing preferably on a side of the inner race or on the side of a part fixed to the inner race.

The diaphragm is preferably substantially flat before assembly and provided at its inner edge with a shallow annular projection, so that, when the outer edge is nipped between one side of the outer ball race and an abutment on the part to which this race is fixed, the projection on the inner edge of the diaphragm will contact with the adjacent side of the inner ball race. This projection may have the form of a beading pressed out in the diaphragm material, or it may be a ring of impervious bearing material secured to the diaphragm.

The thickness of the diaphragm and the depth of the said projection may be such that the diaphragm may be strained, without exceeding the elastic limit of the diaphragm material, from its natural shape until the outer edge and the top of the annular projection lie in the same plane.

It has been found that, where the fluid pressures and/or temperatures to be dealt with are relatively high and where the material of which either of the relatively rotatable parts or of the clamping members is made has a coefficient of thermal expansion differing substantially from the coefficient of thermal expansion of the steel of which the bearing races are made, leakage is apt to occur in course of time between the bearing races and such parts or members, so that, though fluid cannot leak round the bearing surface of the diaphragm, the arrangement as a whole is not completely fluid-tight.

A further object of the present invention is to provide an improved arrangement of diaphragm gland which overcomes the difficulty due to different expansions of the various elements with temperature change.

According to the present invention in a further aspect, the improved diaphragm gland includes, on at least one of the relatively rotatable parts, a resilient member so arranged that it is capable of deforming to compensate for difference in thermal expansion between the part on which it is mounted and the associated race.

Thus the clamping member may have the form of an externally-threaded plug, a resilient washer being disposed with the race between the plug and the abutment. Alternatively, the plug may be circumferentially grooved in such a manner that one end thereof is resilient.

Where the clamping member is in the form of a ring secured to the associated part by screws or bolts, the screws or bolts may be provided with resilient distance-pieces. Alternatively this ring may be arranged to be sufficiently resilient to provide the desired compensation.

In a further alternative arrangement, the improved diaphragm gland comprises an annular impervious diaphragm, a ball or roller bearing race clamped in a ring of a material, such as steel, having substantially the same coefficient of thermal expansion as the race, a flange formed externally on the ring and secured to one of the relatively rotatable parts between which the passage of fluid is to be prevented, by screws or bolts, which are preferably provided with resilient washers or sleeves, a co-operating race clamped to the other of the relatively rotatable parts, an edge of the diaphragm being clamped together with one of said races, and the diaphragm contacting over an annular rubbing surface with a side of the other of said races or of a washer or sleeve clamped together with that race.

The invention will be further described with reference to the accompanying drawings in which Figs. 1 to 6 show various examples, in sectional elevation of glands used for sealing the driven shaft of a hydraulic coupling of the kinetic type with respect to a casing forming part of the driving element.

Referring to Fig. 1, the driven shaft 10 of the hydraulic coupling passes through an axial hole in a boss 11 formed on a dished cover member 12 attached to the driving part (not shown) of the coupling. A ball bearing, which is preferably of the deep groove type adapted to carry both radial and axial loads, supports the driven shaft in the boss of the cover member. The inner race 13 of this bearing is located by a shoulder 14 on the driven shaft, being held against this shoulder by a nut 15 engaged with a thread 16 on the shaft and bearing against the side of the race remote from the shoulder 14. The depth of the shoulder is substantially less than the radial dimension of the sides of the race, so that the race projects beyond the top of the shoulder.

The outer race 17, of 2½ in. outside diameter, is similarly located by a shoulder 18 on the boss 11, this shoulder being on the same side of the ball bearing as the shoulder 14 on the shaft. An annular diaphragm 19 of spring steel, which may be 0.015 in. thick and which has a diameter equal to that of the outer race, is placed between the shoulder 18 and the side of the race 17. A hollow screw-threaded plug 20 is engaged with an internal thread 21 in the bore of the boss 11 and bears, either indirectly as shown, or directly against the side of the outer race 17 remote from the shoulder 18, so that the diaphragm 19 is nipped between the race and the shoulder.

The diameter of the central hole in the diaphragm is less than the outer diameter of the inner ball race 13, but larger than the diameter over the top of the shoulder 14 on the driven shaft. The edge of the diaphragm surrounding the central hole is provided with an arcuate beading 19′ pressed out of the diaphragm with its convex side towards the ball bearing. The beading has a depth of about 0.015 in. and the top of it is removed by a grinding and lapping operation for a depth of about 0.005 in. Since the sides of the two races of the ball bearing are ground to a high degree of accuracy so as to lie in the same plane, the diaphragm is slightly strained to a very flat conical shape, the lapped annular bearing, which is about 0.030 in. in radial width, being pressed by the elasticity of the diaphragm material into contact with the side of the inner race. With this arrangement the inner ball race serves both its normal purpose as a part of the ball bearing, and also as one of the annular bearing elements of the diaphragm gland.

A similar diaphragm 19a is preferably provided also on the opposite side of the bearing, being nipped between the screwed plug 20 and the outer race 17, so that the thrusts due to the two diaphragms balance.

With a bearing of 2¾ in. outside diameter, a rather stouter diaphragm may be used, for example 0.020 in. in thickness with a beading of about 0.015 in. in depth, the top of the beading being removed by a grinding and lapping operation for a depth of about 0.005 in.

Diaphragms of the above given dimensions have sufficient flexibility for taking up the effects of wear or of reasonable angular deviations between the relatively rotatable parts. For example the load due to straining diaphragms of the dimensions stated above is about 30 lb. per 0.010 in. of deflection.

If desired, in place of the bearing surface formed by a beading, there may be provided a ring of bearing material, such as bronze, secured to the diaphragm.

The diaphragm may be arranged to rotate with the inner race and rub on the outer race. The first-described arrangement, however, gives a lower rubbing speed.

The diaphragm may be slightly coned in its unstrained condition, the apex lying on the same side as the annular projection. In this way the bearing pressure on the annular projection is higher when the apparatus is new, but the diaphragm is better able to accommodate itself to wear the parts allowing axial movement.

Where the casting 12 is of a material, for example aluminium alloy, having a co-efficient of thermal expansion differing substantially from that of steel, a spring washer, such as the dished washer 22, is nipped, with the race 17 and the two diaphragms, between the shoulder 18 and the threaded plug 20. In the figure this washer is shown between the diaphragm 19a and the plug 20, but it may be placed elsewhere between the shoulder 18 and the plug 20. The plug 20 is screwed home, clamping the two diaphragms, the race and the spring washer between itself and the shoulder. When the coupling gets hot in use, the aluminium alloy boss 11 expands more than does the ball race 17, as is indicated in Fig. 1, but the resilience of the washer 22 ensures that fluid-tight radial joints are maintained at at least one side of the race. The screwed plug 20 is of a material having the same co-efficient of expansion as the aluminium alloy boss 11, in order to avoid slackening due to radial differential movements affecting the fit of the threads. The plug 20 may be locked in various ways, for example, by a screw 23 threaded in a tapped hole in the boss and engaging in a radial hole in the plug, the screw being in turn locked by a tab washer 25.

The diaphragm, instead of contacting directly with the bearing races, may be associated with distance-pieces in the form of washers or sleeves which can readily be ground on their faces so as to abut accurately with the sides of the races and with the diaphragm and which, in effect, function as extensions of the actual ball races.

Figure 2:
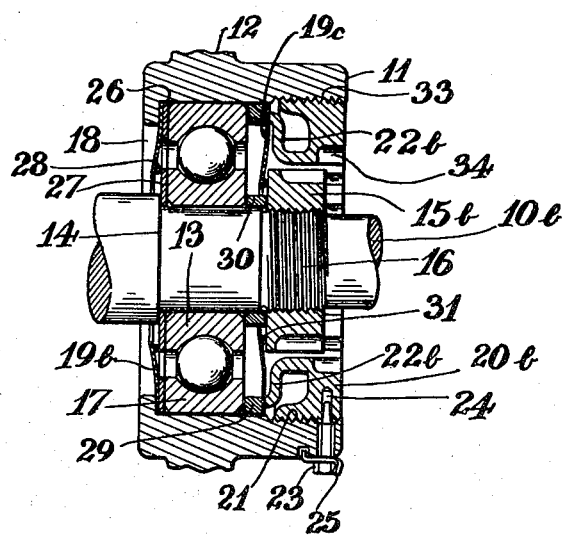

With such diaphragm glands a fluid pressure difference between the opposite sides of the diaphragm alters the bearing pressure. If the higher pressure acts on the side of the diaphragm remote from the annular bearing area, the effect is to make the seal more secure, whereas if a high enough pressure acts in the opposite way the diaphragm will allow leakage. A construction providing two glands in series, each adapted to give a securer seal when the pressure difference acts in the same direction, is conveniently arranged as shown in Fig. 2. The inner race 13 of the ball bearing is held against the shoulder 14 on the shaft 10b by a short relatively thin sleeve 30 closely fitting the shaft and in turn held against the race by a nut 15b threaded on the shaft and having a ground surface on the side turned towards the race, a thin hardened steel or bronze washer 27 being interposed between the race 13 and the shoulder 14. This washer is provided with a short annular projection 28 on its outer edge. The outer race 18 is located by the shoulder 18 in the bore of the boss 11, an annular spring steel diaphragm 19b and a ground washer 26 being interposed between the race 18 and this shoulder. The spacing members 26 and 27, 28 are of such a size that the diaphragm, which is flat before it is assembled, abuts with its inner edge against the projection 28 when the device is assembled and is strained into a more or less conical shape.

Adjacent to the other side of the outer race 17 is a short tubular distance-piece 29 having ground ends; against this distance-piece is placed an annular spring steel diaphragm 19c having secured to its inner edge a phosphor-bronze ring 31 bearing against the ground inner face of the nut 15b. The diaphragm 19c is held in place by a hollow screw-threaded plug 20b, engaged with the internal thread 21 in the bore of the boss 11, the parts 19b, 26, 17, 29 and 19c being all nipped together between the shoulder 18 and the plug 20b. With this arrangement, the higher fluid pressure exists on the left-hand side of the member 12, and the effect of this pressure on the diaphragm 19b, and also on the diaphragm 19c if any leakage occurs at the diaphragm 19b, is to make the seal more secure.

In order to compensate for the difference in thermal expansion between the boss 11, when this is made of an aluminium alloy, and the ball race 17 and the other parts nipped against the shoulder 18, in this example the screwed plug 20b is made of a bronze having a relatively high elastic limit. The plug is roughly C shaped in section; the lower part 33 of the C is the portion on which the screw thread is formed; the back of the C is thickened and provided with external dogs 34 adapted to be engaged by a suitable box spanner; and the upper limb 22b of the C is extended so as to project axially of the plug slightly beyond the lower limb of the C and form a resilient bearing face, which is forced back so as to narrow the C when the plug is tightened home to clamp the race and diapragms against the shoulder 18.

The type of diaphragm shown in Fig. 1 may be used in the series gland construction shown in Fig. 2, and in place of the resilient plug 20b shown in Fig. 2 a rigid plug may be used in combination with a resilient washer such as the conical washer shown in Fig. 1 or any other suitable washer capable of being compressed axially.

Figure 3:
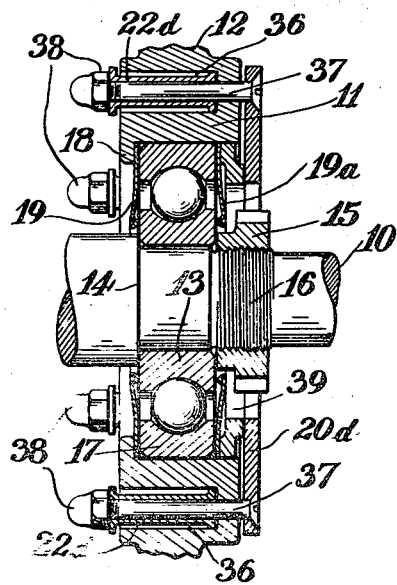

In the modification shown in Fig. 3 the bore of the aluminium alloy boss 11 is not screw threaded, and the length of this bore, measured from its larger end to the shoulder 18, is slightly less than the total axial length of the outer ball race 17, the diaphragms 19 and 19a and a distance-piece 39 that is clamped with this ball race. A flat steel clamping ring 20d, the internal diameter of which is somewhat less than the external diameter of the ball race 17, is secured adjacent to the larger end of the bore of the boss and abutting against the distance-piece 39. The ring may be held in place by a series of bolts 37 distributed round the boss 11 and lying parallel to the bearing axis. In this case the bolts may pass through holes in the boss which are counterbored at 36, on the side remote from the clamping ring for part of the way through the boss, to accommodate steel sleeves 22d bearing at one end on the bottoms of the counterbores and at the other end on nuts 38 screwed onto the bolts (or bearing on the bolts' heads, according to which way the bolts are inserted). Since the total length of a bolt and its associated sleeve considerably exceeds the thickness of the aluminium alloy between the bottom of the counterbore 36 and the clamping ring 20d, the bolts and sleeves are not permanently deformed when the aluminium alloy expands, and they consequently act as resilient members which ensure that the clamping ring at all times keeps the ball race tightly clamped.

In place of the counterbores and sleeves in the last described construction, other resilient means, such as spring washers, may be provided on the bolts.

Figure 4:
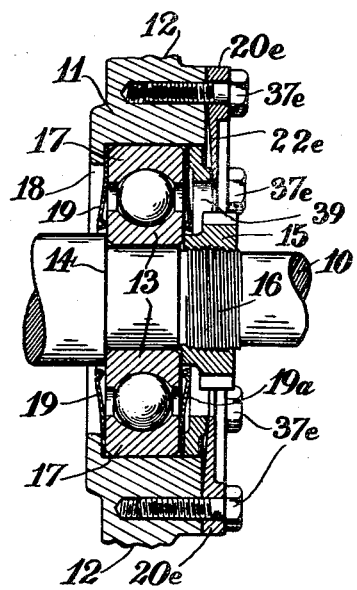

In a modification of the construction just described, shown in Fig. 4, the radially inner part 22e of the clamping ring 20e is of such a section that it is resilient enough to accommodate the difference in the expansion of the aluminium alloy and the steel and to keep the ball race 17 always securely clamped. In this case the radially outer part of the clamping ring is rigidly secured to the aluminium alloy boss 11 by means of bolts or screws 37e of a material having substantially the same co-efficient of expansion as this alloy, for example a forging aluminium alloy such as the material known by the registered trade mark "Duralumin".

Figure 5:
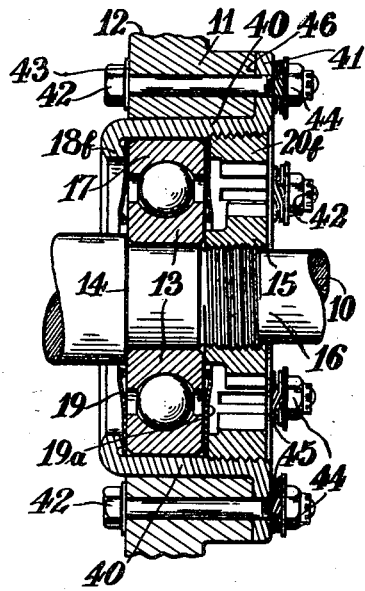

In the example shown in Fig. 5 the outer ball race 17 is fixed in a steel housing ring 40, for example, by being clamped, with the diaphragms 19 and 19a, against an internal shoulder 18f on the ring by a plug 20f screwed into the ring. The housing ring is provided with an external circumferential flange 41, which is secured to a facing 46 on the boss 11 of the aluminium alloy casting 12, the ring 40 being a sliding fit in the bore of the boss 11. In this example the flange 41 is secured to the boss 11 by bolts 42, having fluid-retaining washers 43 under their heads, spring washers 45 being interposed between the flange 41 and nuts 44 screwed on the bolts 42. The washers 45 are not fully compressed when the device is assembled and they are therefore capable of compensating for the difference in thermal expansion between the boss 11 and the bolts 42. In place of the spring washers, sleeves may be fitted in counterbores, as shown in Fig. 3, or aluminium alloy screws may be used as shown in Fig. 4.

Figure 6:
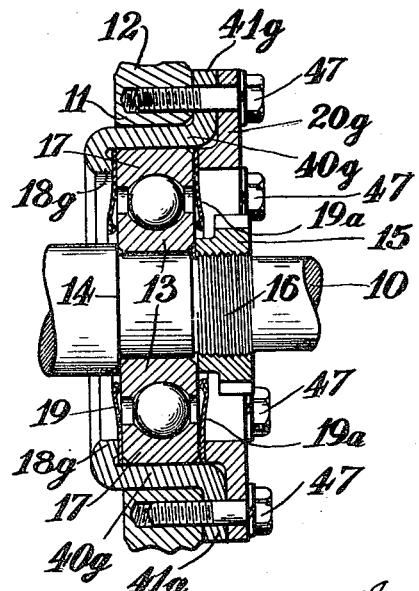

In the modification shown in Fig. 6, the outer ball race 17 is fitted within a steel housing ring 40g having an inner shoulder 18g at one end and a circumferential flange 41g on its exterior at the other end. This ring is fitted in the bore of the boss 11 of the aluminium alloy casting 12, and the bearing race, together with the diaphragms 19 and 19a, is clamped against the shoulder by a clamping ring 20g placed against the flange 41g, the inner diameter of the clamping ring being somewhat less than the outer diameter of the ball race. The housing ring and the clamping ring are secured to the alloy boss by a series of screws or bolts disposed parallel to the bearing axis. As shown in Fig. 6 screws 47 of "Duralumin" or equivalent material may be used. Alternatively, steel bolts may be used with compensating devices as shown in Fig. 3 or Fig. 5.

In the examples shown in Figs. 1 and 3 to 6, washers may be placed between the diaphragms and the race with which they are clamped, and between the beaded edge of the diaphragm and the adjacent inner race of the ball bearing and if desired the beading on the inner edge of the diaphragm may be omitted, the diaphragm being arranged to rub on a beading formed on the outer edge of a washer placed adjacent to the inner ball race, as described with reference to Fig. 2.

We claim:

1. In a bearing assembly having two relatively rotatable parts each comprising an annular abutment, a clamping member capable of being tightened axially, and a bearing race nipped between said abutment and said clamping member; and rolling elements cooperating with said races for positioning said parts relatively to each other, the combination of means for preventing the passage of fluid axially between said races, said means including an annular impervious resilient diaphragm one edge of which is nipped with one of said races upon tightening of the corresponding clamping member and the other edge portion of which is provided with a beading resiliently engaging an end of the other of said races.

2. In a bearing assembly having a housing portion, a shaft portion penetrating said housing portion, said portions each comprising an annular abutment, a clamping member capable of being tightened axially, and a bearing race nipped between said abutment and said clamping member, and rolling elements cooperating with said races for positioning said portions relatively to each other, the combination of means for preventing the passage of fluid axially through said housing portion, said means including an annular impervious resilient diaphragm the outer edge of which is nipped with the outer one of said races upon tightening of the clamping member associated with said housing portion and the inner border of which is resiliently engaged with a plane annular rubbing surface of said shaft portion, and said means also including a resilient member associated with the clamping member of said housing portion, said resilient member being so stressed as to maintain said outer race clamped in a fluid-tight manner to said housing upon change of dimensions of the latter due to operating factors.

3. In a bearing assembly having a housing, a shaft penetrating said housing, said shaft and housing each having an annular abutment, an annular clamping member capable of being tightened axially, and a bearing race nipped between said abutment and said clamping member, and rolling elements between said races, the combination of means for preventing the passage of fluid between said races, said means including an annular impervious resilient diaphragm the outer edge of which is gripped against one end of the outer of said races upon tightening of the corresponding clamping member and the inner border of which is provided with a beading resiliently engaging an end of the inner of said races, there being provided a radial clearance between the inner edge of said diaphragm and said shaft.

4. In a bearing assembly having a housing portion, a shaft portion, each of said portions including an annular abutment, a clamping member capable of being tightened axially, and at least a bearing race nipped between said abutment and said clamping member, and rolling elements cooperating with said races, the combination of means for preventing the passage of fluid axially through said housing portion, said means including an annular impervious resilient diaphragm the outer border of which is nipped with the outer of said races by means of the correspond clamping member, and a resilient distance-piece between said diaphragm and said member and so stressed as to maintain said diaphragm and outer race rigidly clamped during changes of shape of said housing portion due to operating conditions, and the inner border of said diaphragm having a radial clearance with respect to said shaft portion and resiliently engaging a plane annular rubbing area of said shaft portion.

5. In a bearing having an inner race, an outer race and rolling elements disposed between said races and maintaining an end of said inner race substantially in a common plane with an end of said outer race, the combination of means for preventing the passage of fluid between said races, said means including a substantially flat annular steel diaphragm having a diameter substantially equal to that of said outer race and a thickness between $1/150$ and $1/300$ of its diameter, and a beading on the inner edge of said diaphragm which when the diaphragm is unstressed extends axially to a distance of between $1/100$ and $1/300$ of said diameter beyond the plane containing the outer border of said diaphragm at the same side thereof as said beading, and means clamping said outer border against said end of the outer race and thereby maintaining said beading elastically engaged with said end of the inner race.

ARTHUR CECIL BASEBE.
HAROLD SINCLAIR.